United States Patent
Maghrabi et al.

(10) Patent No.: US 9,127,192 B2
(45) Date of Patent: *Sep. 8, 2015

(54) INVERT DRILLING FLUIDS HAVING ENHANCED RHEOLOGY AND METHODS OF DRILLING BOREHOLES

(75) Inventors: Shadaab Syed Maghrabi, Thane (IN); Vikrant Bhavanishankar Wagle, Mumbai (IN); Kushabhau Dagadu Teke, Pune (IN); Dhanashree Gajanan Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 770 days.

This patent is subject to a terminal disclaimer.

(21) Appl. No.: 13/342,179

(22) Filed: Jan. 2, 2012

(65) Prior Publication Data

US 2012/0097403 A1  Apr. 26, 2012

Related U.S. Application Data

(63) Continuation-in-part of application No. 12/660,873, filed on Mar. 6, 2010, now Pat. No. 8,936,111.

(51) Int. Cl.
*C09K 8/36* (2006.01)
*E21B 43/16* (2006.01)

(52) U.S. Cl.
CPC .. *C09K 8/36* (2013.01); *E21B 43/16* (2013.01)

(58) Field of Classification Search
CPC ............ E21B 7/00; E21B 21/068; C09K 8/36
USPC ........... 175/65; 166/305.1; 507/129, 137, 138
See application file for complete search history.

(56) References Cited

U.S. PATENT DOCUMENTS

| | | |
|---|---|---|
| 3,304,349 A | 2/1967 | Kwan-Ting |
| 4,250,045 A | 2/1981 | Coupland et al. |
| 4,816,551 A | 3/1989 | Oehler et al. |
| 5,254,531 A | 10/1993 | Mueller et al. |
| 5,849,824 A | 12/1998 | Mercer et al. |
| 5,909,779 A | 6/1999 | Patel et al. |
| 6,034,194 A | 3/2000 | Dershem et al. |
| 6,159,906 A | 12/2000 | McNally et al. |
| 6,165,971 A | 12/2000 | Oppenlander et al. |
| 6,262,180 B1 | 7/2001 | Klun et al. |
| 6,339,048 B1 | 1/2002 | Santhanam et al. |
| 6,620,770 B1 | 9/2003 | Kirsner et al. |

(Continued)

FOREIGN PATENT DOCUMENTS

| | | |
|---|---|---|
| CA | 2451926 A1 | 6/2005 |
| DE | 10 2004 051 280 A1 | 1/2001 |

(Continued)

OTHER PUBLICATIONS

Halliburton, COLDTROL, Product Data Sheet, May 25, 2010, 1 page.

(Continued)

*Primary Examiner* — Catherine Loikith
(74) *Attorney, Agent, or Firm* — Holly Soehnge; Baker Botts L.L.P.

(57) ABSTRACT

An invert emulsion drilling fluid, and a method of drilling with such fluid, having improved rheology at low mud weights and high temperatures. The improved rheology is effected with addition of hydrophobic amines, most preferably dimer diamines.

13 Claims, 10 Drawing Sheets

(56) References Cited

U.S. PATENT DOCUMENTS

| | | | |
|---|---|---|---|
| 7,309,724 | B2 | 12/2007 | Dershem et al. |
| 7,345,010 | B2 | 3/2008 | Thompson et al. |
| 2003/0130135 | A1 | 7/2003 | Hou et al. |
| 2003/0144153 | A1 | 7/2003 | Kirsner et al. |
| 2004/0097380 | A1 | 5/2004 | Summerhill et al. |
| 2004/0259739 | A1 | 12/2004 | Monfreux-Gaillard et al. |
| 2005/0032652 | A1 | 2/2005 | Kirsner et al. |
| 2005/0137277 | A1 | 6/2005 | Dershem et al. |
| 2007/0078062 | A1 | 4/2007 | Kirsner et al. |
| 2007/0082822 | A1 | 4/2007 | Kirsner et al. |
| 2007/0167333 | A1 | 7/2007 | Hurd et al. |
| 2007/0197403 | A1 | 8/2007 | Dino et al. |
| 2008/0009421 | A1 | 1/2008 | Patel et al. |
| 2008/0171671 | A1 | 7/2008 | Mueller et al. |
| 2008/0188382 | A1 | 8/2008 | Thompson et al. |
| 2008/0194433 | A1 | 8/2008 | Tehrani |
| 2009/0163386 | A1 | 6/2009 | Dino |
| 2009/0301972 | A1 | 12/2009 | Hines et al. |

FOREIGN PATENT DOCUMENTS

| | | | |
|---|---|---|---|
| EP | 0271943 | A2 | 6/1988 |
| EP | 0467533 | A1 | 1/1992 |

OTHER PUBLICATIONS

Halliburton, ENCORE BASE, Product Data Sheet, Apr. 5, 2010, 1 page.

Baroid Fluid Services, ACCOLADE High-Performance Synthetic-Based Fluids from Baroid, Product brochure, Dec. 2007, 2 pages, HO6027 Halliburton.

Baroid Fluid Services, ACCOLADE Drilling Fluid Exceeds New GOM Environmental Standards and Boosts Performance, Product brochure, Oct. 2005, 2 pages, 02-7031.

Halliburton, ADAPTA, Product Data Sheet, Mar. 2, 2010, 1 page.

Halliburton, ATC, Product Data Sheet, Mar. 24, 2010, 1 page.

Halliburton, TAU-MOD, Product Data Sheet, Mar. 26, 2010, 1 page.

Halliburton, TEMPERUS, Product Data Sheet, Mar. 26, 2010, 1 page.

Baroid Fluid Services, ENCORE High-Performance Isomerized Olefin (IO) Based Fluid, Product Brochure, Dec. 2007, 2 pages, H06026.

Halliburton, FACTANT, Product Data Sheet, Mar. 26, 2010, 1 page.

Baroid Fluid Services, INNOVERT High Performance Parraffin/Mineral Oil-Based Fluids from Baroid, Product brochure, Dec. 2007, 2 pages, H06024.

Halliburton, OMC 42, Product data sheet, Mar. 26, 2010, 1 page.

Halliburton, Rhemod L, Product Data Sheet, Mar. 26, 2010, 1 page.

J.M. Davidson et al, "Rheology of Various Drilling Fluid Systems under Deepwater Drilling Conditions" SPE56632, Oct. 1999.

J. Lee, et al., "A New Approach to Deepwater Drilling Using SBM with Flat Rheology" AADE-04-DF-HO-37, Apr. 2004.

K. Burrows, et al. "Benchmark Performance: Zero Barite Sag and Significantly Reduced Downhole . . . " IADC/SPE 87138, Mar. 2004.

E. VanOort, et al."New Flat Rheology Synthetic-Based Mud for Improved Deepwater Drilling" SPE 90987, Sep. 2004.

J. Rojas, et al. "New Constant-Rheology Synthetic-Based Fluid Reduces Downhole Losses in Deepwater Environments", SPE 109586, Nov. 2006.

Halliburton, EZ MUL NT, Product Data Sheet, Mar. 26, 2010, 1 page.

International Preliminary Report on Patentability Issued in related PCT Application No. PCT/US2012/072246 mailed Jul. 8, 2014, 10 pages.

INVERT DRILLING FLUIDS HAVING ENHANCED RHEOLOGY AND METHODS OF DRILLING BOREHOLES

RELATED APPLICATION

This application is a continuation-in-part of U.S. patent application Ser. No. 12/660,873, filed Mar. 6, 2010, pending.

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to methods for improving the rheology of invert emulsion drilling fluids, particularly at high temperatures, and to compositions for low mud weight, invert emulsion drilling fluids, with good stability and high performance properties.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

An important property of the drilling fluid is its rheology, and specific rheological parameters are intended for drilling and circulating the fluid through the well bore. The fluid should be sufficiently viscous to suspend barite and drilled cuttings and to carry the cuttings to the well surface. However, the fluid should not be so viscous as to interfere with the drilling operation.

Specific drilling fluid systems are selected to optimize a drilling operation in accordance with the characteristics of a particular geological formation. Oil based muds are normally used to drill swelling or sloughing shales, salt, gypsum, anhydrite and other evaporate formations, hydrogen sulfide-containing formations, and hot (greater than about 300 degrees Fahrenheit ("° F.") holes, but may be used in other holes penetrating a subterranean formation as well.

An oil-based invert emulsion-based drilling fluid may commonly comprise between about 50:50 to about 95:5 by volume oil phase to water phase. Such oil-based muds used in drilling typically comprise: a base oil comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. In the past, such additives commonly included organophilic clays and organophilic lignites. See H. C. H. Darley and George R. Gray, Composition and Properties of Drilling and Completion Fluids 66-67, 561-562 ($5^{th}$ ed. 1988). However, recent technology as described for example in U.S. Pat. Nos. 7,462,580 and 7,488,704 to Kirsner, et al., introduced "clay-free" invert emulsion-based drilling fluids, which offer significant advantages over drilling fluids containing organophilic clays.

As used herein and for the purposes of the present invention, the term "clay-free" (or "clayless") means a drilling fluid made without addition of any organophilic clays or organophilic lignites to the drilling fluid composition. During drilling, such "clay-free" drilling fluids may acquire clays and/or lignites from the formation or from mixing with recycled fluids containing clays and/or lignites. However, such contamination of "clay-free" drilling fluids is preferably avoided and organophilic clays and organophilic lignites should not be deliberately added to "clay-free" drilling fluids during drilling.

Invert emulsion-based muds or drilling fluids (also called invert drilling muds or invert muds or fluids) comprise a key segment of the drilling fluids industry, and "clay-free" invert emulsion-based muds, particularly those capable of "fragile gel" behavior as described in U.S. Pat. Nos. 7,462,580 and 7,488,704 to Kirsner, et al., are becoming increasingly popular.

Clay-free invert emulsion drilling fluids, like INNOVERT® drilling fluid available from Halliburton Energy Services, Inc., in Duncan, Okla. and Houston, Tex., for example, have been shown to yield high performance in drilling, with "fragile gel" strengths and rheology leading to lower equivalent circulating density (ECDs) and improved rate of penetration ROP.

A limiting factor in drilling a particular portion of a well is the mud weight (density of the drilling fluid) that can be used. If too high a mud weight is used, fractures are created in lost-circulation zones with resulting loss of drilling fluid and other operating problems. If too low a mud weight is used, formation fluids can encroach into the well, borehole collapse may occur due to insufficient hydrostatic support, and in extreme cases safety can be compromised due to the possibility of a well blowout. Many times, wells are drilled through weak or lost-circulation-prone zones prior to reaching a potential producing zone, requiring use of a low mud weight and installation of sequential casing strings to protect weaker zones above the potential producing zone. A particularly critical drilling scenario is one that combines deepwater and shallow overburden, as is typical of ultra deepwater fields in Brazil. This scenario is characterized by high pore fluid pressure, low effective stresses, low fracturing gradients and narrow mud weight windows.

Commercially available clay-free invert emulsion drilling fluids may have less than preferred rheology at low mud weights, that is, mud weights ranging from about 9 ppg to about 12 ppg, with temperatures up to about 375° F. or higher. Addition of inert solids may improve the rheology, but result in a decreased rate of penetration during drilling and loss, of or decline in other benefits seen with a clay free system. Such inert solids include for example, fine sized calcium carbonate, and the term as used herein is not meant to be understood to include or refer to drill cuttings. Low mud weight or reduced density clay-free oil based invert emulsion drilling fluids also may show a decline in the desired "fragile gel" strength characteristic of clay-free invert emulsion drilling fluids. "Fragile gel" strength generally refers to the ability of the drilling fluid to both suspend drill cuttings at rest and show a lack of a pressure spike upon resumption of drilling.

Increasingly invert emulsion-based drilling fluids are being subjected to ever greater performance and cost demands as well as environmental restrictions. Consequently, there is a continuing need and industry-wide interest in new drilling fluids that provide improved performance while still affording environmental and economical acceptance.

SUMMARY OF THE INVENTION

The present invention provides oil-based invert emulsion drilling fluids with improved rheology without the addition of inert solids, and at temperatures ranging from about 100° F. to about 375° F. or higher. The present invention also provides improved methods of drilling wellbores in subterranean formations employing oil-based invert emulsion muds or drilling fluids having low mud weight. As used herein, the term "drilling" or "drilling wellbores" shall be understood in the broader sense of drilling operations, which include running casing and cementing as well as drilling, unless specifically indicated otherwise.

The invert emulsion drilling fluid of the present invention, or used in methods of the present invention, comprises an oil:water ratio preferably in the range of 50:50 to 95:5 and preferably employs a natural oil, such as for example without limitation diesel oil or mineral oil, or a synthetic base, as the oil phase and water comprising calcium chloride as the aqueous phase. The rheology modifier or additive for rheology stability is a hydrophobic amine additive, having the following general structure:

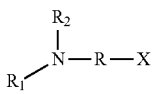

where R represents a hydrophobic or partially hydrophobic group with carbon atoms from 16-54 which can be straight chained or branched and can be aliphatic, cycloaliphatic and aryl aliphatic; N is a primary, secondary or tertiary amine wherein the R1 and R2 groups may be the same or different and are selected from the group consisting of a hydrogen group, alkyl group, cyano alkyl group, amino alkyl group, amino aryl group, hydroxyl alkyl group or a derivative thereof; alternatively the R1 and R2 can be a carbonyl group, carbonate group, alkoxy group, hydroxyl group or a derivative thereof; X comprises a hydrophilic group such as an amine which can be primary, secondary or tertiary with substituents being a hydrogen group, alkyl group, cyano alkyl group, amino alkyl group, amino aryl group, hydroxyl alkyl group or a derivative thereof; alternatively the X group can be an amide group, amine oxide group, betaine group, ester group, carboxylic acid group, ether group, hydroxyl group, phosphate group, phosphonate group, pyrrolidone group, haloformyl group, nitrate group, nitrite group, sulfate group, sulfonate group, imidazoline group, pyridine group, sugar group, or a combination or derivative thereof. Most preferably, the hydrophobic amine used in the present invention is a C36 fatty dimer diamine having the following molecular structure:

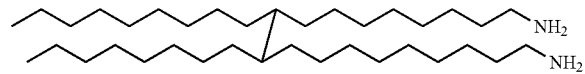 [SMILES: CCCCCCCCCC(CCCCCCCCN)C(CCCCCCCC)CCCCCCCCCN]

A preferred commercially available C36 dimer diamine contains C18 fatty monoamine and C54 fatty trimer triamine which are obtained during the commercial production of the dimer diamine. Generally, quantities of such hydrophobic amine ranging from about 1 ppb to about 6 ppb are preferred and are effective even when the mud weight is low, that is, is in the range of about 9 to about 12 ppg.

Addition of the hydrophobic amine additive to the drilling fluid increases the Low Shear Yield Point (LSYP), Yield Point (YP), and the 10 minute Gel Strength but limits the increase in the Plastic Viscosity (PV) to about 60% or less, relative to the drilling fluid not having the hydrophobic amine additive, when measured at 120° F. At High Pressure High Temperature (HPHT) conditions, the invert emulsion drilling fluid of the present invention comprising the hydrophobic amine additive has increased LSYP, YP, and 10 minute Gel Strength but similar or lower PV, relative to the drilling fluid without the hydrophobic amine additive. Such a lower PV seen with the invert emulsion drilling fluid of the invention is believed to help minimize the amount of density increase caused by pumping of the fluid. Invert emulsion drilling fluids of the invention may also demonstrate "fragile gel" behavior when the drilling fluid is "clay-free."

DETAILED DESCRIPTION OF PREFERRED EMBODIMENTS

Figure 1A:
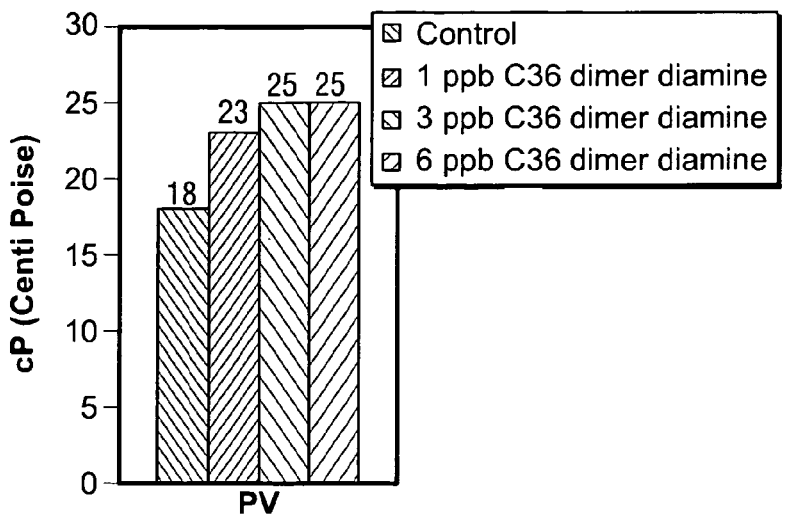
FIGS. 1a, 1b, and 1c are bar graphs comparing the plastic viscosity, yield point and low shear yield point of example 9 ppg drilling fluid formulations of the invention having various concentrations of a hydrophobic amine rheology modifier, with a formulation without that additive.

The present invention provides an oil-based, invert emulsion drilling fluid with improved performance in the field at mud weights in the range of about 9 ppg to about 18 ppg, and a method of drilling employing that drilling fluid. The oil base may be a natural oil such as for example diesel oil, or a synthetic base such as, for example, ACCOLADE® base comprising esters or ENCORE® base comprising isomerized olefins, both available from Halliburton Energy Services, Inc., in Houston, Tex. and Duncan, Okla. A mineral oil may even be successfully used as the oil base in the present invention, even though in the prior art some difficulties have been experienced in obtaining desirable rheological properties with mineral oils under certain conditions such as low mud weights, that is, mud weights ranging from about 9 to about 12 ppg, and particularly at high temperatures (greater than 225° F.). Mineral oils particularly suitable for use in the invention are selected from the group consisting of n-paraffins, iso-paraffins, cyclic alkanes, branched alkanes, and mixtures thereof.

An aqueous solution containing a water activity lowering compound, composition or material, comprises the internal phase of the invert emulsion. Such solution is preferably a saline solution comprising calcium chloride (typically about 25% to about 30%, depending on the subterranean formation water salinity or activity), although other salts or water activity lowering materials such as for example glycerol or sugar known in the art may alternatively or additionally be used. Such other salts may include for example sodium chloride, sodium bromide, calcium bromide and formate salts. Water preferably comprises less than 50%, or as much as about 50%, of the drilling fluid and the oil:water ratio preferably ranges from about 50:50 to about 95:5.

Drilling fluids of the present invention uniquely include a hydrophobic amine additive as a rheology modifier, as will be discussed further below. Further, the drilling fluids of, or for use in, the present invention, have added to them or mixed with their invert emulsion oil base, other fluids or materials needed to comprise complete drilling fluids. Such other materials optionally may include, for example: additives to reduce or control low temperature rheology or to provide thinning, for example, additives having the trade names COLD-TROL®, ATC®, and OMC2™; additives for enhancing viscosity, for example, an additive having the trade name RHE-MOD L™ (modified fatty acid); additives for providing temporary increased viscosity for shipping (transport to the well site) and for use in sweeps, for example, an additive having the trade name TEMPERUS™ (modified fatty acid); additives for filtration control, for example, additives having the trade names ADAPTA® and BDF-366; an emulsifier activator, such as, for example, lime; additives for high temperature high pressure control (HTHP) and emulsion stability, for example, an additive having the trade name FACTANT™ (highly concentrated tall oil derivative); and additives for emulsification, for example, an additive having the trade name EZ MUL® NT (polyaminated fatty acid). All of the aforementioned trademarked products are available from Halliburton Energy Services, Inc. in Houston, Tex., and Duncan, Okla., U.S.A. As with all drilling fluids, the exact formulations of the fluids of the invention vary with the particular requirements of the subterranean formation.

A preferred commercially available drilling fluid system for use in the invention is the INNOVERT® drilling fluid system, having a paraffin/mineral oil base, available from Baroid, a Halliburton Company, in Houston, Tex. and Duncan, Okla. The INNOVERT® drilling fluid system typically comprises the following additives, in addition to the paraffin/mineral oil base and brine, for use as an invert emulsion drilling fluid: RHEMOD™ L modified fatty acid suspension and viscosifying agent, BDF-366™ or ADAPTA™ copolymer for HPHT filtration control, particularly for use at high temperatures, and EZ MUL® NT polyaminated fatty acid emulsifier/oil wetting agent, also particularly for use at high temperatures. Commercially available INNOVERT® drilling fluid systems also typically include TAU-MOD™ amorphous/fibrous material as a viscosifier and suspension agent. However, with the present invention, where the drilling fluid system has uniquely added thereto a hydrophobic amine additive as a rheology modifier, TAU-MOD™ material is optional.

Invert emulsion drilling fluids of the present invention, comprising the hydrophobic amine additive, maintain acceptable and even preferred rheology measurements at low mud weights and do not experience a decreased rate of penetration (and with clay-free invert emulsion drilling fluids, also do not experience a decline in desired fragile gel strength) when in use in drilling even at high temperatures and pressures. At HPHT conditions, the invert emulsion drilling fluids of the present invention, comprising the hydrophobic amine additive, has increased LSYP, YP, and 10 minute Gel Strength but similar or lower PV relative to the drilling fluid without the hydrophobic amine additive. These advantages of the present invention are believed to be due to the addition of the hydrophobic amine additive to the drilling fluid. The advantages of the present invention are especially appreciated where the drilling fluid does not also contain organophilic clay or lignite.

Preferred commercially available hydrophobic amines suitable for use in the present invention include without limitation VERSAMINE® 552 hydrogenated fatty C36 dimer diamine, and VERSAMINE® 551 fatty C36 dimer diamine, both available from Cognis Corporation (functional products) of Monheim, Germany and Cincinnati, Ohio and PRIAMINE™ 1073 and PRIAMINE™1074 fatty C36 dimer diamine, both available from Croda Internationale Plc of Goole East Yorkshire, United Kingdom and New Castle, Del. Typically, an amount of such dimer diamine in the range of about 1 pound per barrel (ppb) to about 3 ppb is sufficient for purposes of the invention. These fatty dimer diamines are prepared commercially from fatty dimer diacids which have been produced from dimerisation of vegetable oleic acid or tall oil fatty acid by thermal or acid catalyzed methods.

The dimerisation of C18 tall oil fatty acids produces the material leading to the C36 dimer acids. This material is a mixture of monocyclic dicarboxylic acid, acyclic dicarboxylic acid and bicyclic dicarboxylic acid along with small quantities of trimeric triacids. These diacids are converted into diamines via the reaction scheme given below:

Reaction Scheme I.

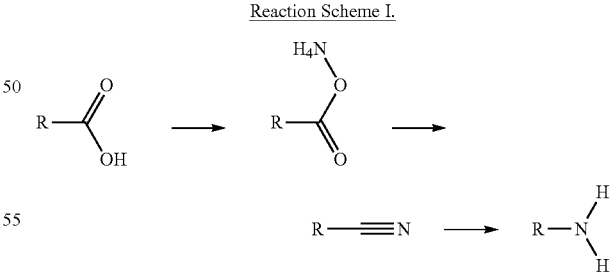

These diamines are further converted into compounds that fall under the scope of hydrophobic amine additives. These diamines are converted into cyanoethyl derivatives via cyanoethylation with acrylonitrile; these cyanoethyl derivatives are further reduced into aminopropyl amines via reduction as shown in the reaction scheme II below, as taught in U.S. Pat. No. 4,250,045, issued Feb. 10, 1981 to Coupland, et al.

Reaction Scheme II

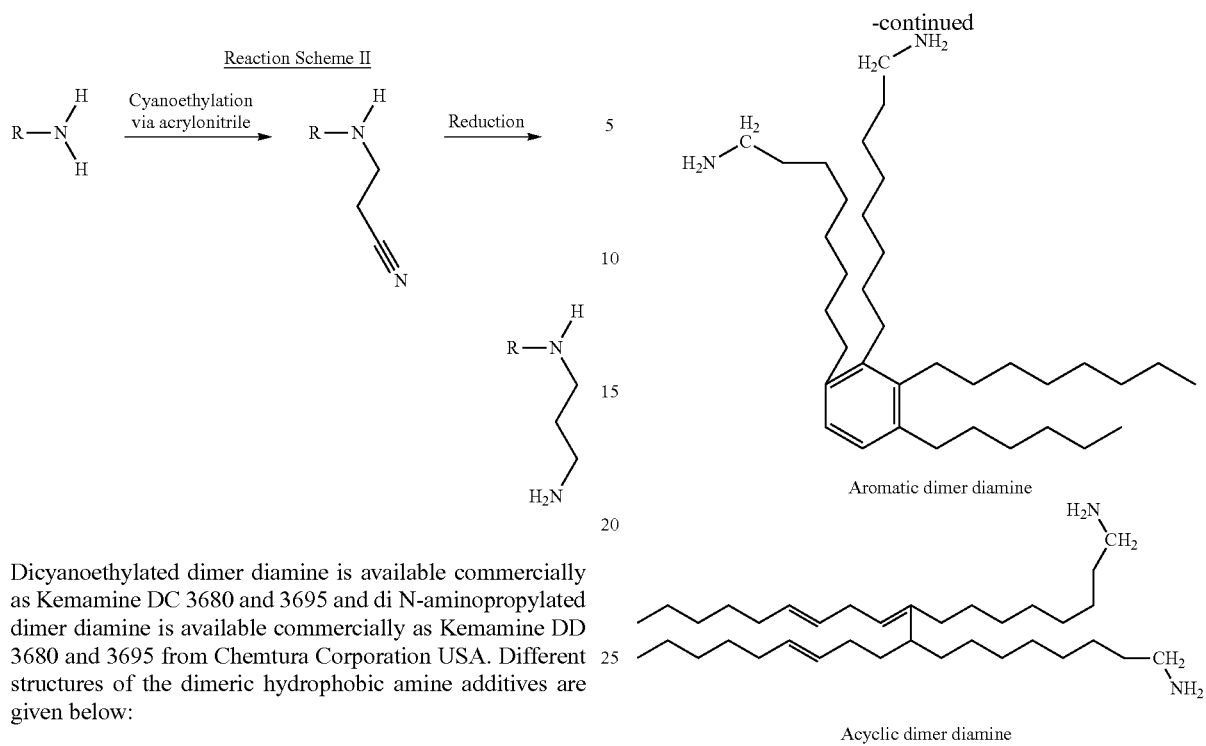

Dicyanoethylated dimer diamine is available commercially as Kemamine DC 3680 and 3695 and di N-aminopropylated dimer diamine is available commercially as Kemamine DD 3680 and 3695 from Chemtura Corporation USA. Different structures of the dimeric hydrophobic amine additives are given below:

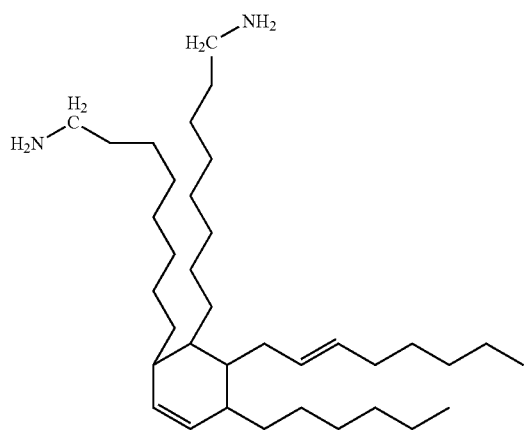

Monocyclic dimer diamine

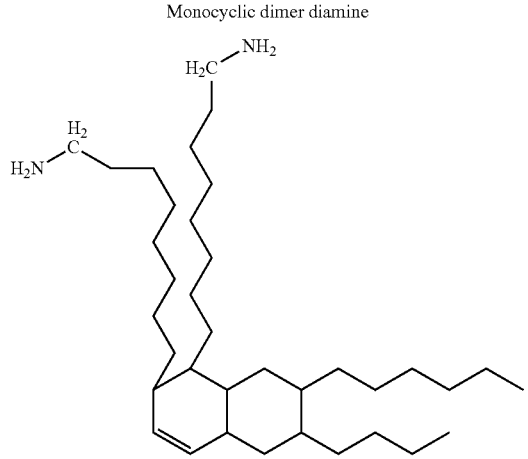

Bicyclic dimer diamine

Aromatic dimer diamine

Acyclic dimer diamine

Laboratory tests demonstrate the effectiveness of the present invention. Referring to experiments whose results are graphed in FIG. 1, a 9 ppg INNOVERT® invert emulsion drilling fluid was prepared using paraffin/mineral oil base in a 60:40 oil to water ratio with calcium chloride brine having a water phase salinity of 200,000 parts per million (ppm). To this, additives were mixed in for a drilling fluid having the components as indicated in Table 1 below:

TABLE 1

|  | Control | Invention Formulations containing C36 dimer diamine | | |
|---|---|---|---|---|
|  | 1 | 2 | 3 | 4 |
| Components | | | | |
| Mud weight (ppg) | 9 | 9 | 9 | 9 |
| Oil water ratio | 60/40 | 60/40 | 60/40 | 60/40 |
| EDC 99 DW ® paraffin/mineral oil (bbl) | 0.505 | 0.505 | 0.505 | 0.505 |
| EZ-MUL ® NT emulsifier (lb) | 8 | 8 | 8 | 8 |
| Lime (lb) | 3 | 3 | 3 | 3 |
| RHEMOD ® L suspension and viscosifying agent (lb) | 3 | 3 | 3 | 3 |
| ADAPTA ® filtration control agent (lb) | 1.5 | 1.5 | 1.5 | 1.5 |
| 20% CaCl$_2$ Brine (lb/bbl) | 164.2 | 164.2 | 164.2 | 164.2 |
| TAU- MOD ™ material (lb) | 5 | 5 | 5 | 5 |
| REV DUST (lb) | 20 | 20 | 20 | 20 |
| Barite (lb) | 9.9 | 9.9 | 9.9 | 9.9 |
| BARACARB ® 5 sized calcium carbonate (lb) | 20 | 20 | 20 | 20 |
| C36 dimer diamine (lb) | — | 1 | 3 | 6 |
| 16 hr. hot roll (temp. ° F.) | 250 | 250 | 250 | 250 |
| Properties | | | | |
| 600 rpm | 43 | 58 | 68 | 74 |
| 300 rpm | 25 | 35 | 43 | 49 |
| 200 rpm | 19 | 28 | 34 | 38 |
| 100 rpm | 12 | 18 | 23 | 27 |

TABLE 1-continued

|  | Control | Invention Formulations containing C36 dimer diamine | | |
|---|---|---|---|---|
|  | 1 | 2 | 3 | 4 |
| 6 rpm | 4 | 6.0 | 9.0 | 11.0 |
| 3 rpm | 3.5 | 5.0 | 8.0 | 10.0 |
| PLASTIC VISCOSITY (cP) | 18 | 23 | 25 | 25 |
| YIELD POINT (lb/100 ft$^2$) | 7 | 12 | 18 | 24 |
| GELS 10 sec | 3.5 | 6.0 | 11.0 | 11.0 |
| GELS 10 min | 5 | 15 | 20 | 21 |
| LSYP | 3 | 4.0 | 7.0 | 9.0 |
| TAU0 | 3.26 | 4.52 | 7.18 | 8.60 |
| E.S. @ 120° F. | 168 | 143 | 150 | 200 |
| HPHT @ 250° F., ml | 2.0 | 1.6 | 1.4 | 1.2 |

All trademarked products above and in other tables below are available from Halliburton Energy Services, Inc., in Houston, Tex. and Duncan, Okla., except that REV DUST is an artificial drill solid available from Milwhite Inc, in Houston Tex. These compositions set forth in Table 1 were hot rolled at 250° F. for 16 hours. The fluids were then further mixed for 5 minutes and evaluated on a FANN 35 rheometer at 120° F., testing Plastic Viscosity (PV), Yield Point (YP), yield stress (Tau zero) and Low Shear Yield Point (LSYP).

The Plastic Viscosity (PV), Yield Point (YP), Yield Stress (Tau zero) and Low Shear Yield Point (LSYP) of the invert emulsion drilling fluid were determined on a direct-indicating rheometer, a FANN 35 rheometer, powered by an electric motor. The rheometer consists of two concentric cylinders, the inner cylinder is called a bob, while the outer cylinder is called a rotor sleeve. The drilling fluid sample is placed in a thermostatically controlled cup and the temperature of the fluid is adjusted to 120 (±2)° F. The drilling fluid in the thermostatically controlled cup is then placed in the annular space between the two concentric cylinders of the FANN 35. The outer cylinder or rotor sleeve is driven at a constant rotational velocity. The rotation of the rotor sleeve in the fluid produces a torque on the inner cylinder or bob. A torsion spring restrains the movement of the bob, and a dial attached to the bob indicates displacement of the bob. The dial readings are measured at different rotor sleeve speeds of 3, 6, 100, 200, 300 and 600 revolutions per minute (rpm).

Generally, Yield Point (YP) is defined as the value obtained from the Bingham-Plastic rheological model when extrapolated to a shear rate of zero. It may be calculated using 300 rpm and 600 rpm shear rate readings as noted above on a standard oilfield rheometer, such as a FANN 35 or a FANN 75 rheometer. Similarly, Yield Stress or Tau zero is the stress that must be applied to a material to make it begin to flow (or yield), and may commonly be calculated from rheometer readings measured at rates of 3, 6, 100, 200, 300 and 600 rpm. The extrapolation may be performed by applying a least-squares fit or curve fit to the Herchel-Bulkley rheological model. A more convenient means of estimating the Yield Stress is by calculating the Low-Shear Yield Point (LSYP) by the formula shown below in Equation 2 except with the 6 rpm and 3 rpm readings substituted for the 600-rpm and 300-rpm readings, respectively. Plastic Viscosity (PV) is obtained from the Bingham-Plastic rheological model and represents the viscosity of a fluid when extrapolated to infinite shear rate. The PV is obtained from the 600 rpm and the 300 rpm readings as given below in Equation 1. A low PV may indicate that a fluid is capable of being used in rapid drilling because, among other things, the fluid has low viscosity upon exiting the drill bit and has an increased flow rate. A high PV may be caused by a viscous base fluid, excess colloidal solids, or both. The PV and YP are calculated by the following set of equations:

$$PV = (600 \text{ rpm reading}) - (300 \text{ rpm reading}) \quad \text{(Equation 1)}$$

$$YP = (300 \text{ rpm reading}) - PV \quad \text{(Equation 2)}$$

More particularly, each of these tests were conducted in accordance with standard procedures set forth in *Recommended Practice* 13B-2, *Recommended Practice for Field Testing of Oil-based Drilling Fluids*, Fourth Edition, American Petroleum Institute, Mar. 1, 2005, the contents of which is hereby incorporated herein by reference.

Figure 1B:
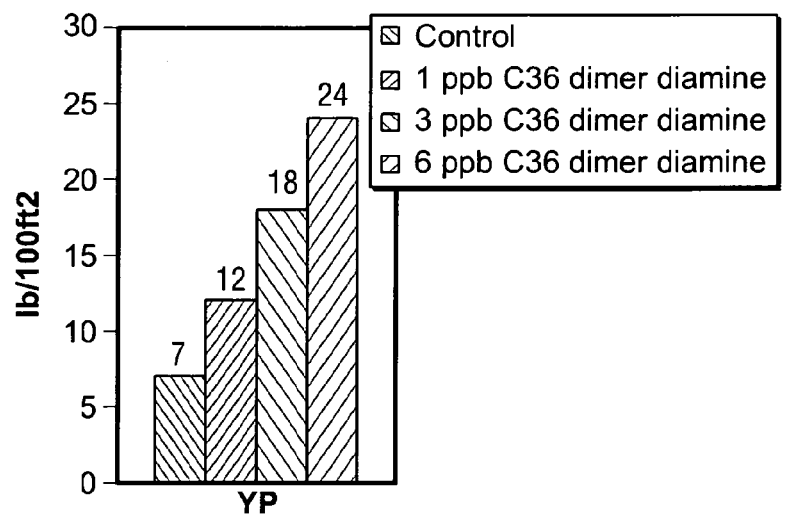
Figure 1C:
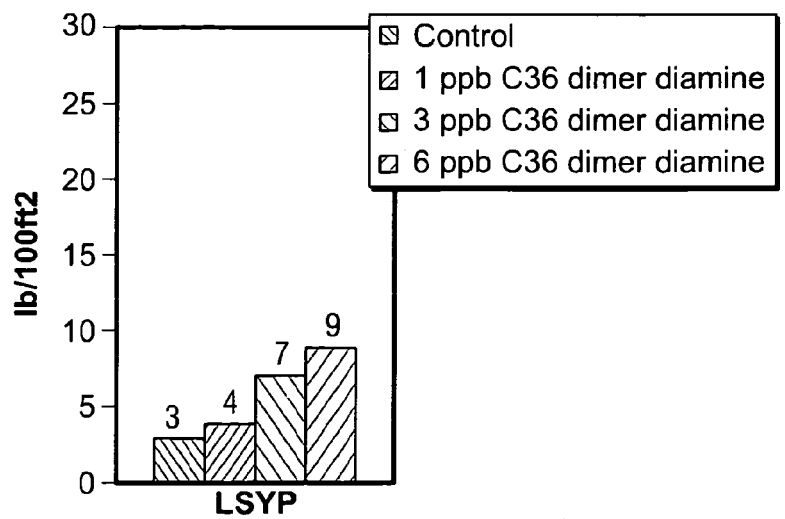

The results of the tests graphed in FIG. 1 demonstrate that 1 to 3 ppb of C36 dimer diamine (hydrophobic amine) additive was sufficient to impart adequate low end rheology to the 9 ppg INNOVERT® invert emulsion drilling fluid. The results in Table 1 show that the PV increased by 60% whereas the YP, LSYP and Gel Strength at 10 mins increased by 250, 200 and 300% respectively with addition of 6 ppb of the hydrophobic amine additive (invention formulation 4) relative to the control (formulation 1).

Figure 2A:
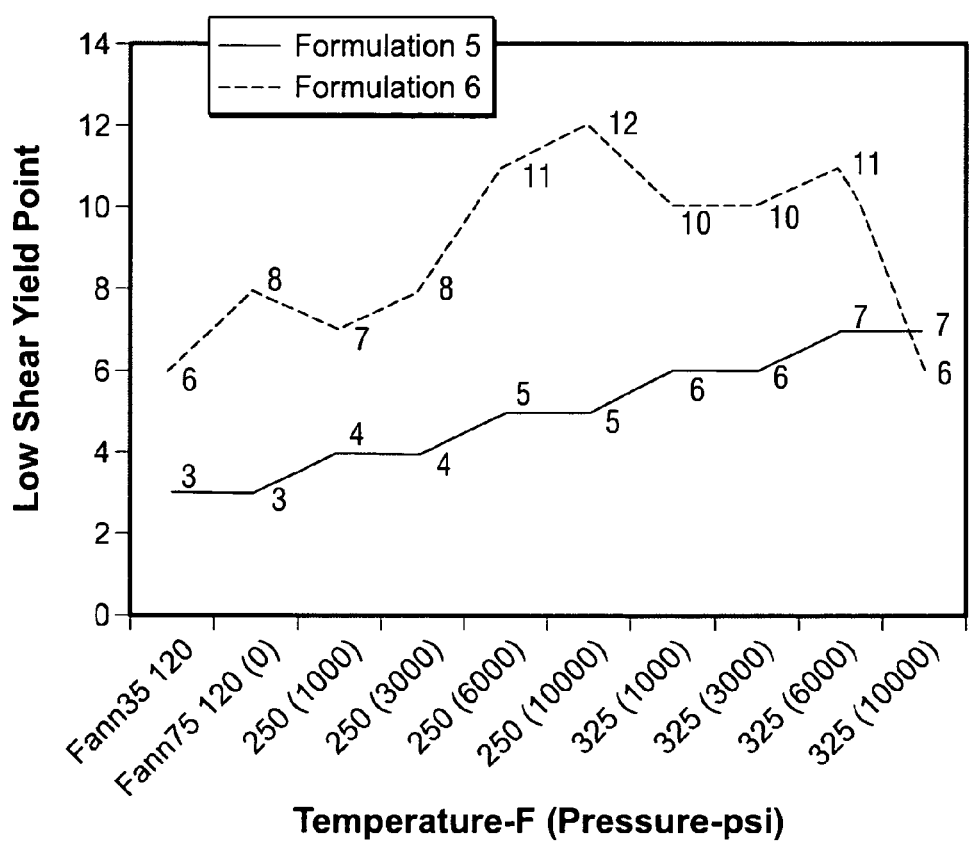
FIG. 2a is a graph comparing, at high temperature and pressure, the low shear yield point of an example drilling fluid formulation of the invention having 3 ppb hydrophobic amine rheology modifier, with a base or control fluid not containing a hydrophobic amine rheology modifier.
Figure 2B:
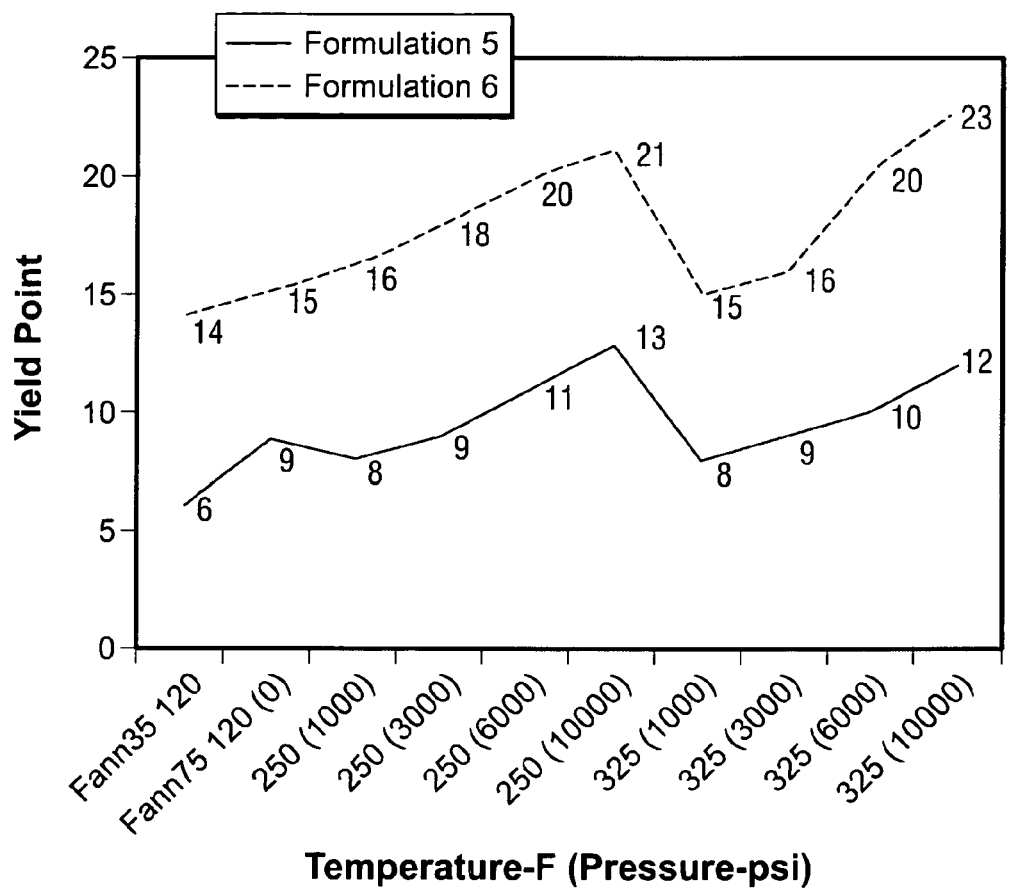
FIG. 2b is a graph comparing, at high temperature and pressure, the yield point of an example drilling fluid formulation of the invention having 3 ppb hydrophobic amine rheology modifier, with a base or control fluid not containing a hydrophobic amine rheology modifier.
Figure 2C:
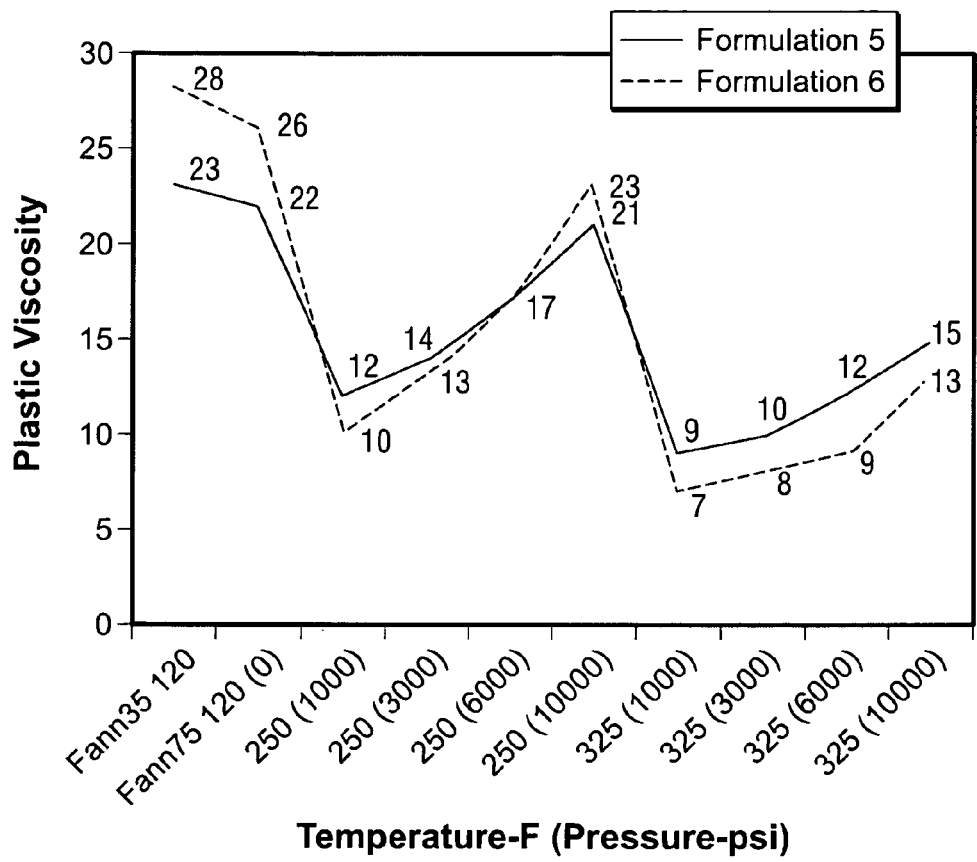
FIG. 2c is a graph comparing, at high temperature and pressure, the plastic viscosity of an example drilling fluid of the invention having 3 ppb hydrophobic amine rheology modifier, with a base or control fluid not containing a hydrophobic amine rheology modifier.

Samples of 9 ppg INNOVERT® invert emulsion drilling fluid containing 3 ppb C36 dimer diamine were evaluated further with a FANN 75 rheometer using simulated down hole conditions, and particularly testing high temperature and high pressure rheology. The FANN 75 rheometer measures similarly as the FANN 35 rheometer but can measure rheology under high temperature and pressure. The compositions of these samples (formulation samples 6) are set forth in Table 2(a) below and the results of these tests are graphed in FIGS. 2(a), 2(b) and 2(c). Before testing, the samples were hot rolled at 325° F. Formulation sample 5 in Table 2(a) was a "control," the drilling fluid without a dimer diamine (hydrophobic amine) additive. The data for these figures is provided in Table 2(b) (control formulation sample 5) and Table 2(c) (invention formulation sample 6) below. Tables 2(b) and 2(c) show that the addition of the hydrophobic amine additive increased the YP and LSYP of the invert emulsion drilling fluid, but maintained similar or lower PV relative to the control (formulation 5), under High Pressure High Temperature (HPHT) conditions.

TABLE 2(a)

| | Formulations | |
|---|---|---|
| Components | Control 5 | Invention Formulation containing C36 dimer diamine 6 |
| Mud Weight (ppg) | 9 | 9 |
| Oil water ratio | 60/40 | 60/40 |
| EDC 99 DW ® paraffin/mineral oil (bbl) | 0.51 | 0.51 |
| EZ-MUL ® NT emulsifier (lb) | 8 | 8 |
| Lime (lb) | 3 | 3 |
| RHEMOD ® L suspension and viscosifying agent (lb) | 3 | 3 |
| ADAPTA ® filtration control agent (lb) | 2.5 | 2.5 |
| 20% CaCl$_2$ Brine (lb/bbl) | 162.2 | 162.2 |
| TAU-MOD ™ material (lb) | 5 | 5 |
| REV DUST (lb) | 20 | 20 |
| Barite (lb) | 27.3 | 27.3 |
| BARACARB ® 5 sized calcium carbonate (lb) | NIL | NIL |
| C36 dimer diamine (lb) | NIL | 3 |
| HOT ROLL TEMPERATURE (° F.) | 325 | 325 |
| E.S. @ 120° F. | 101 | 130 |
| HPHT @ 325° F., ml | 3.6 | 2.4 |

TABLE 2(b)

Rheology Test Results
(Control - Formulation 5)

| | FANN 35 | | | FANN 75 | | | | | | | |
|---|---|---|---|---|---|---|---|---|---|---|---|
| | 120° F. | | | 120° F. | 250° F. | | | | 325° F. | | | |
| RPM | 0 Psi | psi | 3000 psi | 0 psi | 1000 psi | 3000 psi | 6000 psi | 10000 psi | 1000 psi | 3000 psi | 6000 psi | 10000 psi |
| 600 | 52 | 53 | 67 | 54 | 33 | 37 | 44 | 54 | 26 | 29 | 34 | 42 |
| 300 | 29 | 31 | 38 | 31 | 21 | 23 | 27 | 34 | 17 | 19 | 22 | 27 |
| 200 | 21 | 23 | 29 | 24 | 17 | 19 | 22 | 27 | 15 | 17 | 19 | 24 |
| 100 | 13 | 16 | 18 | 16 | 14 | 15 | 17 | 20 | 13 | 15 | 16 | 20 |
| 6 | 5 | 3 | 4 | 4 | 4 | 5 | 5 | 6 | 6 | 6 | 7 | 8 |
| 3 | 4 | 3 | 4 | 4 | 4 | 5 | 5 | 6 | 6 | 6 | 7 | 7 |
| PV | 23 | 22 | 29 | 23 | 12 | 14 | 17 | 21 | 9 | 10 | 12 | 15 |
| YP | 6 | 9 | 9 | 8 | 8 | 9 | 11 | 13 | 8 | 9 | 10 | 12 |
| LSYP | 3 | 3 | 4 | 4 | 4 | 4 | 5 | 5 | 6 | 6 | 7 | 7 |

TABLE 2(c)

Rheology Test Results
(Formulation 6)

| | FANN 35 | | FANN 75 | | | | | | | |
|---|---|---|---|---|---|---|---|---|---|---|
| | 120° F. | 120° F. | 250° F. | | | | 325° F. | | | |
| RPM | 0 psi | 0 psi | 1000 psi | 3000 psi | 6000 psi | 10000 psi | 1000 psi | 3000 psi | 6000 psi | 10000 psi |
| 600 | 70 | 68 | 37 | 43 | 54 | 68 | 29 | 33 | 38 | 49 |
| 300 | 42 | 42 | 26 | 31 | 37 | 45 | 22 | 25 | 29 | 36 |
| 200 | 32 | 33 | 22 | 26 | 30 | 37 | 20 | 22 | 25 | 32 |
| 100 | 21 | 23 | 18 | 20 | 23 | 28 | 17 | 18 | 21 | 25 |
| 6 | 8 | 9 | 9 | 12 | 12 | 13 | 11 | 10 | 11 | 14 |
| 3 | 7 | 8 | 8 | 10 | 11 | 12 | 11 | 10 | 11 | 10 |
| PV | 28 | 26 | 10 | 13 | 17 | 23 | 7 | 8 | 9 | 13 |
| YP | 14 | 15 | 16 | 18 | 20 | 21 | 15 | 16 | 20 | 23 |
| LSYP | 6 | 8 | 7 | 8 | 11 | 12 | 10 | 10 | 11 | 6 |

Figure 3A:
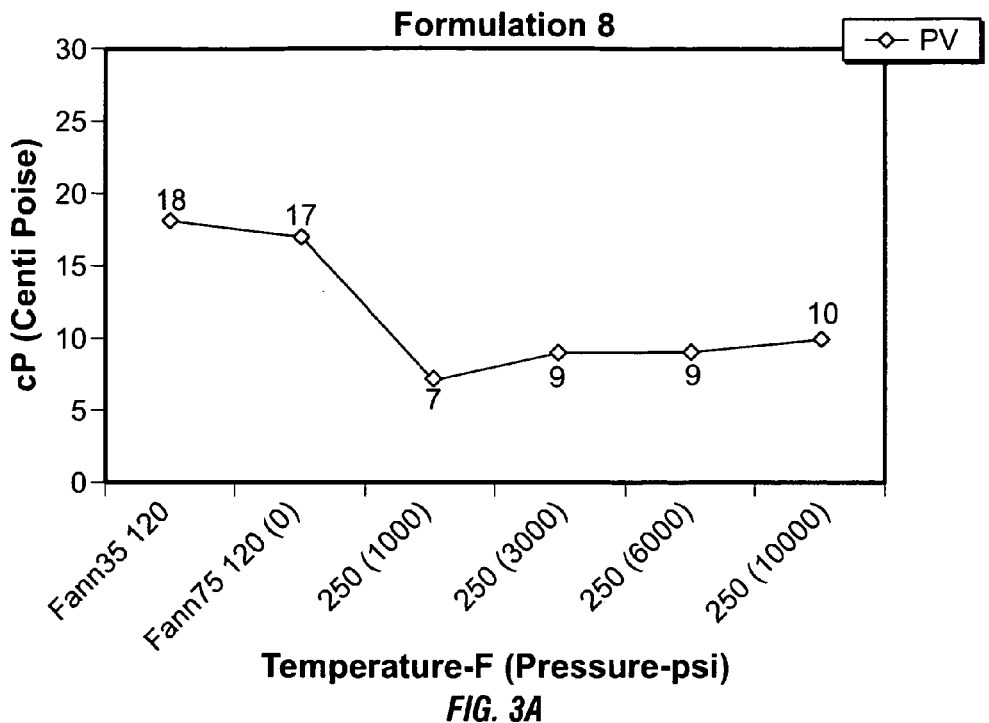
FIGS. 3a, 3b, and 3c are graphs showing the effect of a hydrophobic amine rheology modifier on an example drilling fluid of the invention not containing any inert solids additive.
Figure 3B:
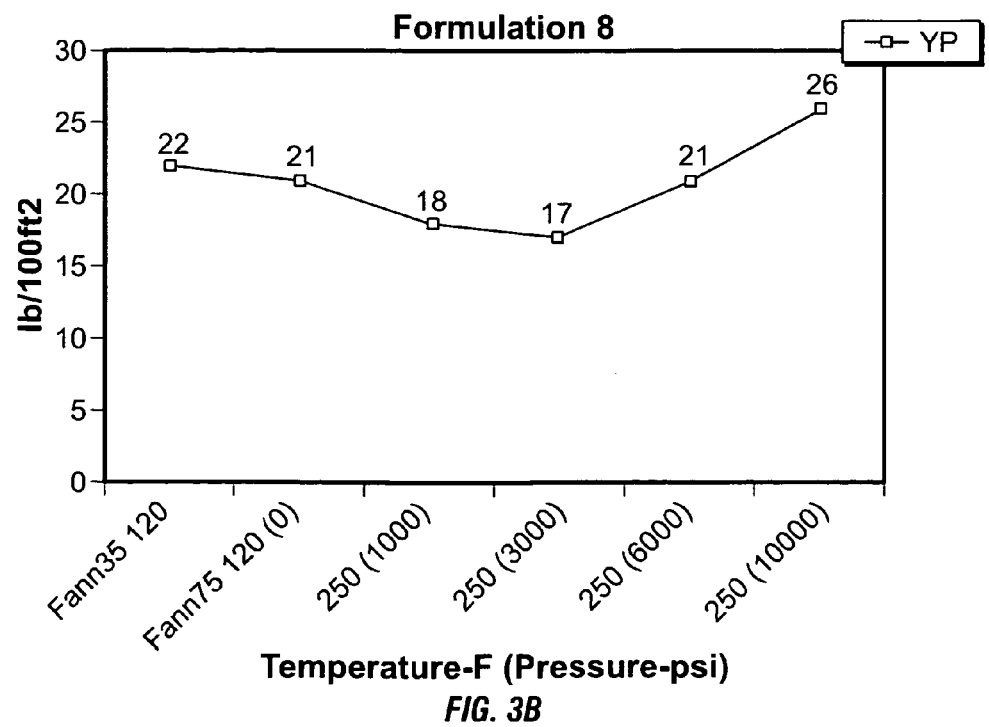
Figure 3C:
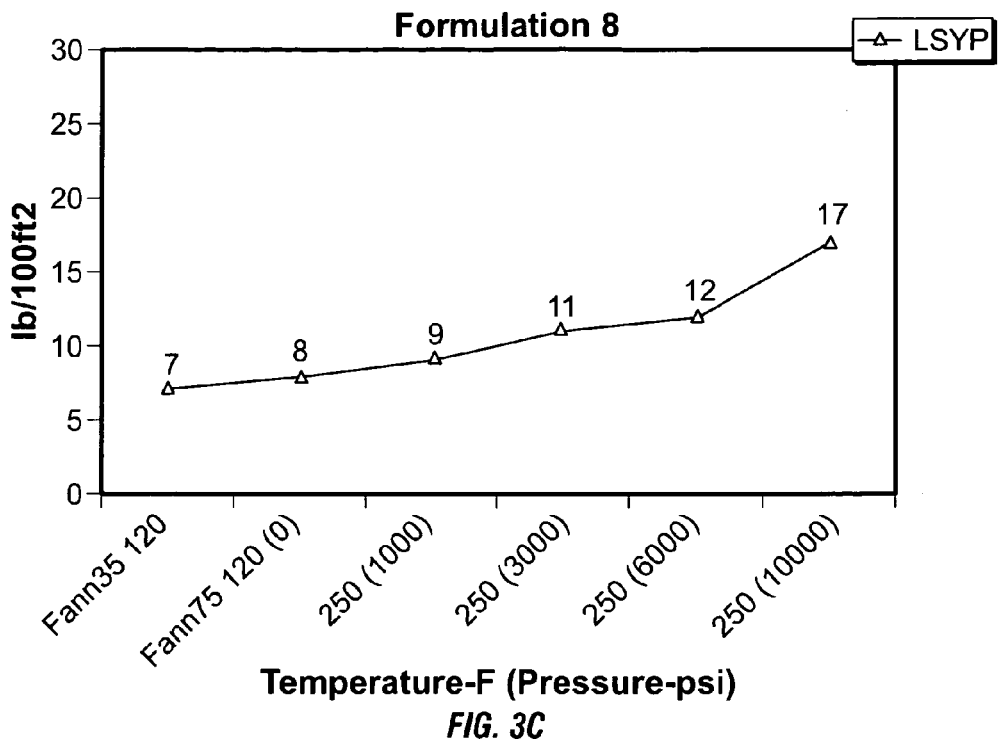
Figure 4A:
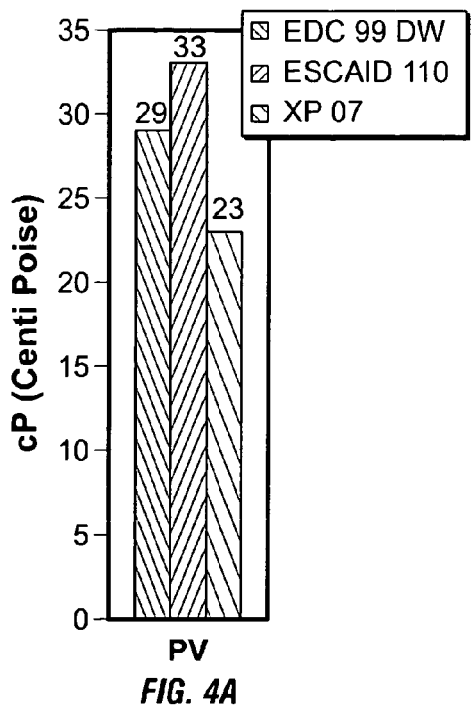
FIGS. 4a, 4b, 4c, 4d, and 4e are bar graphs comparing rheological characteristics of example drilling fluids of the invention having different mineral oil bases.
Figure 4B:
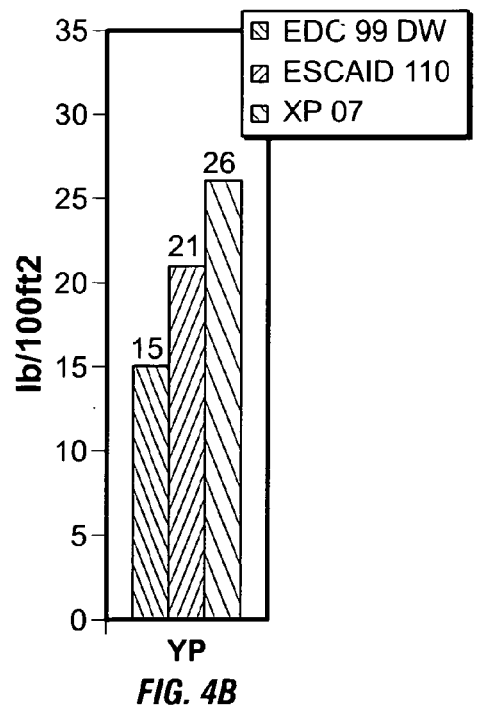
Figure 4C:
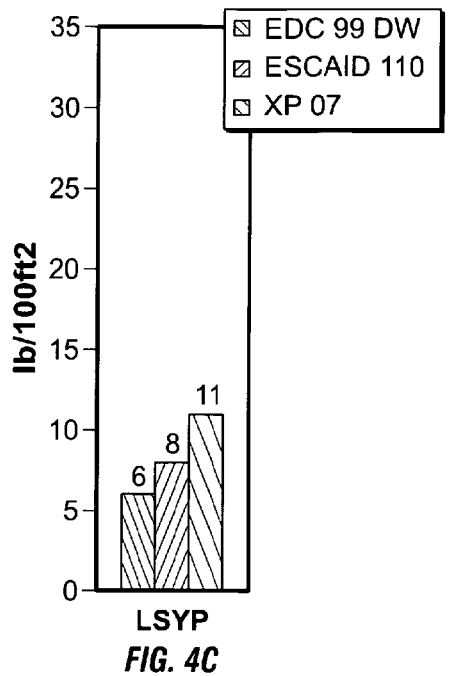
Figure 4D:
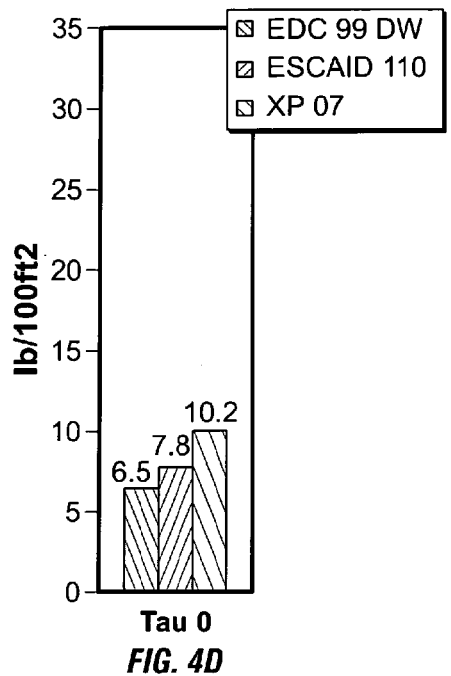
Figure 4E:
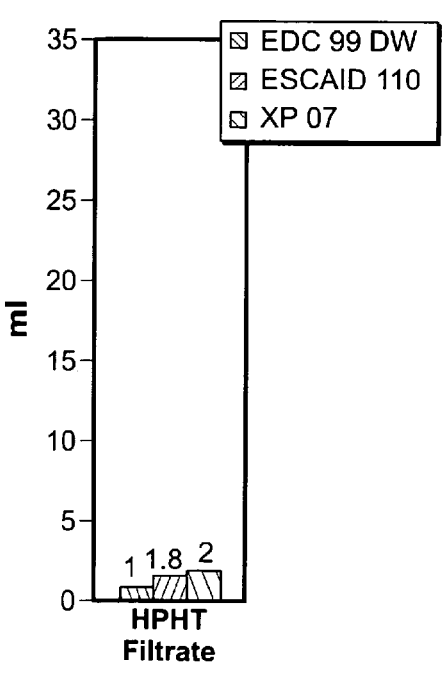
Figure 5A:
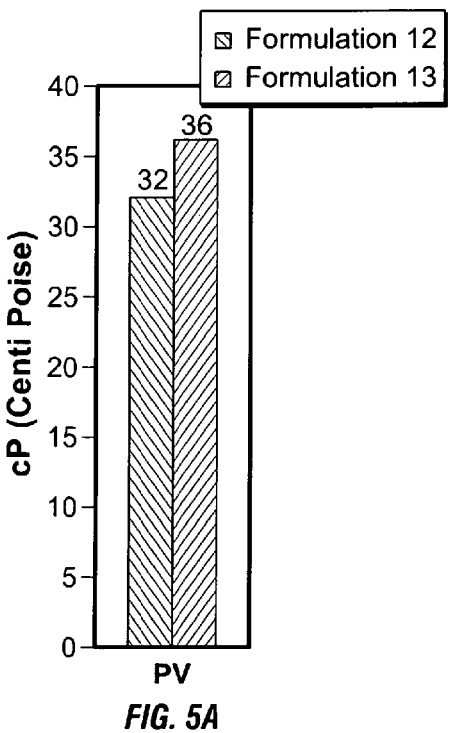
FIGS. 5a, 5b, 5c, 5d, and 5e are bar graphs comparing the rheology of an example 12 ppg drilling fluid of the invention with a base or control drilling fluid not having a hydrophobic amine rheology modifier, after hot rolling for 16 hours at 350° F.
Figure 5B:
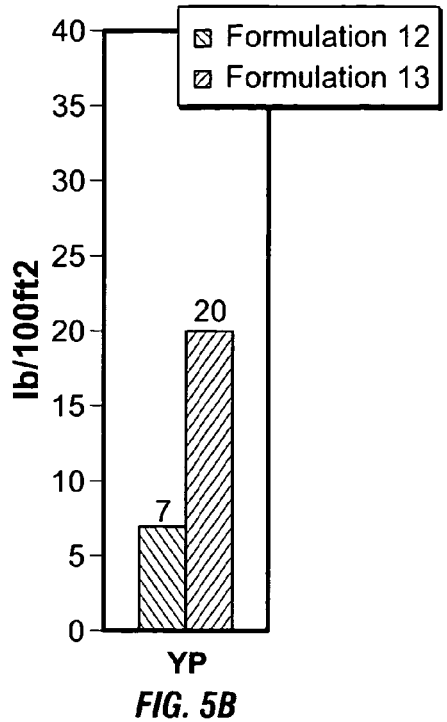
Figure 5C:
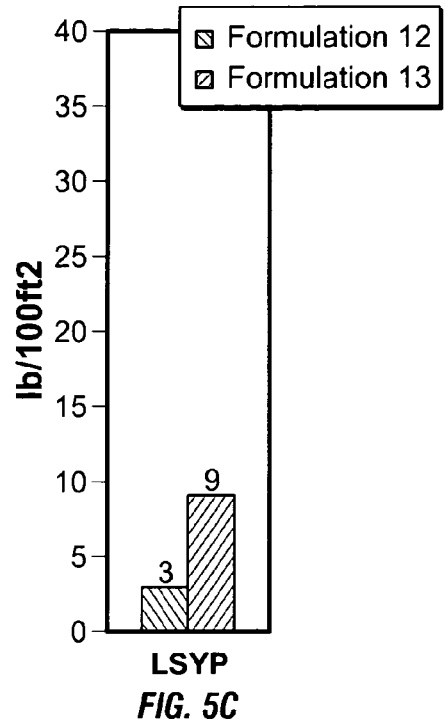
Figure 5D:
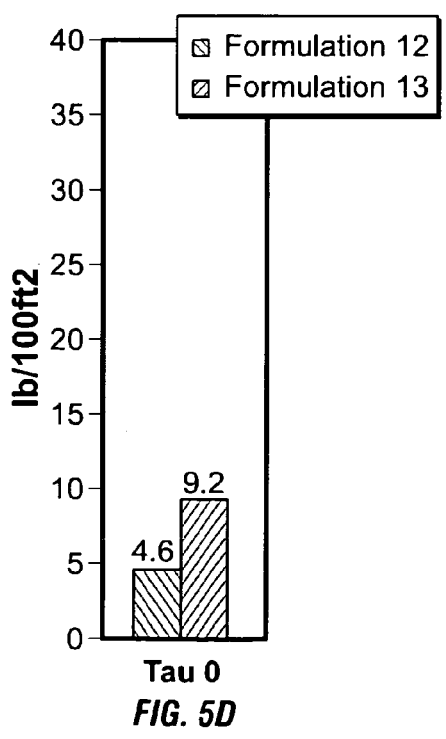
Figure 5E:
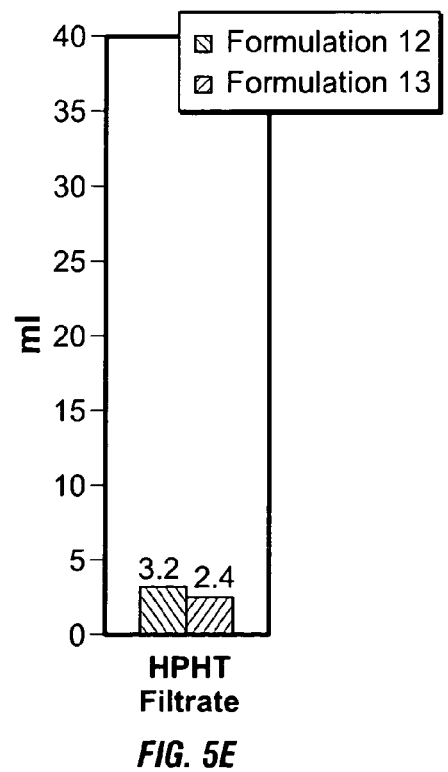

FIG. 3 shows results of tests of the effect of C36 dimer diamine (hydrophobic amine) additive on the rheology of 10 ppg mud weight INNOVERT® base oil invert emulsion drilling fluid formulated without TAU-MOD™ amorphous/fibrous material or a fine grind bridging agent such as BARACARB® 5 material. The exact formulation of the drilling fluid and the test data is shown in Table 3. These tests indicated that the 10 ppg INNOVERT® invert emulsion drilling fluid containing 6 ppb C36 dimer diamine has effective low end rheology, that is, effective rheology even at low mud weights, and even without viscosifier/suspension agent additives such as TAU-MOD™ amorphous/fibrous material and BARACARB® 5 fine grind bridging agent. Addition of C36 dimer diamine increased the PV by about 30% and increased the YP, LSYP and 10 minute Gel Strength by about 250% relative to the control (formulation 7).

TABLE 3

| | Formulation | |
|---|---|---|
| | 7 Control | 8 Invention formulation containing C36 dimer diamine |
| Mud Weight (ppg) | 10 | 10 |
| Oil water ratio | 70/30 | 70/30 |
| XP-07 oil base, bbl | 0.57 | 0.57 |

TABLE 3-continued

| EZ MUL ® NT emulsifier, ppb | 8.00 | 8.00 |
|---|---|---|
| LIME, ppb | 1.50 | 1.50 |
| RHEMOD ® L suspension & viscosifying agent, ppb | 3.00 | 3.00 |
| ADAPTA ® filtration control agent, ppb | 1.50 | 1.50 |
| CaCl₂ soln, ppb | 120.90 | 120.90 |
| REVDUST, ppb | 20.00 | 20.00 |
| BAROID, ppb | 105.90 | 105.90 |
| C36 dimer diamine, ppb | 0 | 6.00 |
| Hot roll at 250 F. for 16 hours FANN 35 Rheology at 120 F. | | |
| 600 rpm | 34 | 58 |
| 300 rpm | 20 | 40 |
| 200 rpm | 15 | 33 |
| 100 rpm | 10 | 23 |
| 6 rpm | 4 | 9 |
| 3 rpm | 3 | 8 |
| PV | 14 | 18 |
| YP | 6 | 22 |
| LSYP | 2 | 7 |
| Tau 0 | 3.2 | 5.9 |
| 10 sec. gel | 5 | 10 |
| 10 min. gel | 5 | 18 |

| | FANN 75 RHEOLOGY-for Formulation 8 | | | | |
|---|---|---|---|---|---|
| Pressure in psi | 0 | 1000 | 3000 | 6000 | 10,000 |
| Temperature in ° F. | 120 | | 250 | | |

TABLE 3-continued

| | | | | | |
|---|---|---|---|---|---|
| 600 rpm | 55 | 32 | 35 | 39 | 46 |
| 300 rpm | 38 | 25 | 26 | 30 | 36 |
| 200 rpm | 32 | 22 | 23 | 26 | 32 |
| 100 rpm | 24 | 19 | 20 | 22 | 28 |
| 6 rpm | 8 | 11 | 13 | 14 | 19 |
| 3 rpm | 8 | 10 | 12 | 13 | 18 |
| PV | 17 | 7 | 9 | 9 | 10 |
| YP | 21 | 18 | 17 | 21 | 26 |
| LSYP | 8 | 9 | 11 | 12 | 17 |
| Tau 0 | 8.6 | 8.7 | 12.3 | 12.5 | 17.7 |
| 10 sec. gel | — | 9 | 9 | 10 | 14 |
| 10 min. gel | — | 8 | 9 | 12 | 16 |

Invert emulsion drilling fluids of the present invention were also prepared and laboratory tested with other commercially available mineral oil invert emulsion bases, particularly EDC 99-DW mineral oil base, available from Total in Paris, France, ESCAID®-110 mineral oil base, available from ExxonMobil, in Houston, Tex., and XP-07 mineral oil base, available from Petrochem Carless in Wynnewood, Okla. and the United Kingdom. More particularly, these samples had the formulations set forth in Table 4 below. Each formulation had a mud weight of 9 ppg and an oil:water ratio of 60:40. After hot rolling at 250° F. for 16 hours, the sample rheologies were evaluated with a FANN 35 rheometer at 120° F. Test data are shown in Table 4 and these results are graphed in FIG. 4, showing the invention to be effective with a variety of commercially available mineral oil invert emulsion drilling fluid bases.

TABLE 4

| Formulation | 9 | 10 | 11 |
|---|---|---|---|
| Mud weight (ppg) | 9 | 9 | 9 |
| Oil water ratio | 60/40 | 60/40 | 60/40 |
| EDC 99 DW ™ oil base, (bbl) | 0.51 | — | — |
| ESCAID ® 110 oil base (bbl) | — | 0.502 | — |
| XP-07 oil base (bbl) | — | — | 0.5 |
| EZ-MUL ® NT (lb) emulsifier | 9 | 9 | 9 |
| Lime (lb) | 3 | 3 | 3 |
| RHEMOD ® L suspension & viscosifying agent, (lb) | 3 | 3 | 3 |
| ADAPTA ® (lb) filtration control agent | 2.5 | 2.5 | 2.5 |
| 20% CaCl₂ Brine (lb/bbl) | 162.2 | 161.7 | 161.1 |
| TAU-MOD ™ material, (lb) | 5 | 5 | 5 |
| REV DUST (lb) | 20 | 20 | 20 |
| Barite (lb) | 27.3 | 31.8 | 36.25 |
| BARACARB ® 5 sized calcium carbonate (lb) | 0 | 0 | 0 |
| C36 dimer diamine,, (lb) | 3 | 3 | 3 |
| Hot roll temp (° F.) | 250 | 250 | 250 |
| 600 rpm | 73 | 87 | 72 |
| 300 rpm | 44 | 54 | 49 |
| 200 rpm | 34 | 42 | 40 |
| 100 rpm | 23 | 28 | 30 |
| 6 rpm | 8.0 | 10.0 | 13.0 |
| 3 rpm | 7.0 | 9.0 | 12.0 |
| PLASTIC VISCOSITY | 29 | 33 | 23 |
| YIELD POINT | 15 | 21 | 26 |
| GELS 10 sec | 8.0 | 10.0 | 13.0 |
| GELS 10 min/30 min. | 14/15 | 25/25 | 20/21 |
| LSYP | 6.0 | 8.0 | 11.0 |
| TAUO | 6.5 | 7.82 | 10.2 |
| E.S. at 120° F. | 164 | 145 | 121 |
| HPHT 250° F., ml | <1.0 | 1.8 | 2.0 |

FIG. 5 compares results from tests of the performance of 12 ppg INNOVERT® invert emulsion drilling fluid (having an oil:water ratio of 70:30), with (Formulation 13) and without C36 dimer diamine (Formulation 12), hot rolled for 16 hours at 350° F. These results demonstrate the superior performance obtained with inclusion of a hydrophobic amine additive such as C36 dimer diamine. The formulation of the samples tested and the test results are set forth in Table 5 below. These results indicate that with the addition of the C36 dimer diamine, the PV increased by about 12.5% whereas the YP, LSYP and the 10 min Gel Strength increased by about 200% relative to the fluids with out the additive.

TABLE 5

| Formulation number | 12 | 13 |
|---|---|---|
| Mud weight | 12 | 12 |
| Oil water ratio | 70/30 | 70/30 |
| EDC 99 DW ™ oil base (bbl) | 0.48 | 0.48 |
| EZ-MUL ® NT emulsifier (lb) | 9 | 9 |
| FACTANT ™ highly concentrated tall oil derivative (lb) | 1 | 1 |
| Lime (lb) | 3 | 3 |
| RHEMOD ® L suspension & viscosifying agent, (lb) | 3 | 3 |
| ADAPTA ® filtration control agent (lb) | 3 | 3 |
| 20% CaCl₂ Brine (lb) | 110.9 | 110.9 |
| TAU-MOD ™ material (lb) | 5 | 5 |
| REV DUST (lb) | 20 | 20 |
| Barite (lb) | 159.2 | 159.2 |
| BARACARB ® 5 sized calcium carbonate (lb) | 50 | 50 |
| C36 dimer diamine (lb) | Nil | 2 |
| 16 hour hot roll temperature F. | 350 | 350 |
| 600 rpm | 71 | 92 |
| 300 rpm | 39 | 56 |
| 200 rpm | 28 | 43 |
| 100 rpm | 18 | 29 |
| 6 rpm | 5 | 11 |
| 3 rpm | 4 | 10 |
| PLASTIC VISCOSITY | 32 | 36 |
| YIELD POINT | 7 | 20 |
| GELS 10 sec | 5 | 13 |
| GELS 10 min/30 min. | 9/12 | 25/27 |
| LSYP | 3 | 9 |
| TAUO | 4.06 | 9.21 |
| E.S. 120° F. | 199 | 292 |
| HPHT at 350 F., ml | 3.2 | 2.4 |

Figure 6:
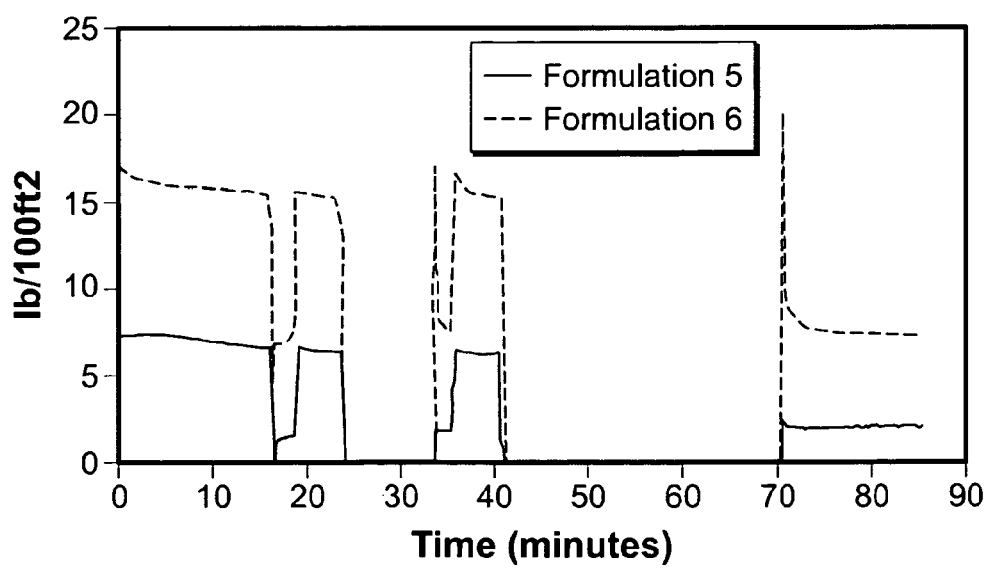
FIG. 6 is a graph showing fragile gel behavior of an example 9 ppg drilling fluid of the invention compared to the behavior of a 9 ppg drilling fluid not having a hydrophobic amine rheology modifier.

FIG. 6 provides a graph showing the favorable characteristic "fragile gel" "L" shape curve obtained in testing a 9 ppg INNOVERT® invert emulsion fluid formulated with C36 dimer diamine. This Figure shows that even a low mud weight drilling fluid with a hydrophobic amine additive of the present invention demonstrates "fragile gel" behavior relative to the fluid without the hydrophobic amine additive.

Figure 7A:
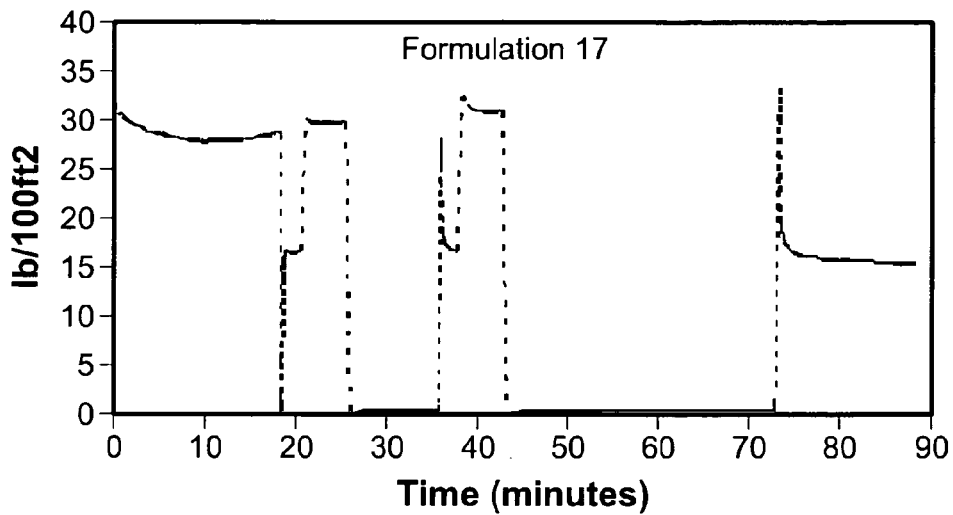
FIG. 7a is a graph showing fragile gel behavior of an example drilling fluid of the invention having a mud weight of 16 ppg.
Figure 7B:
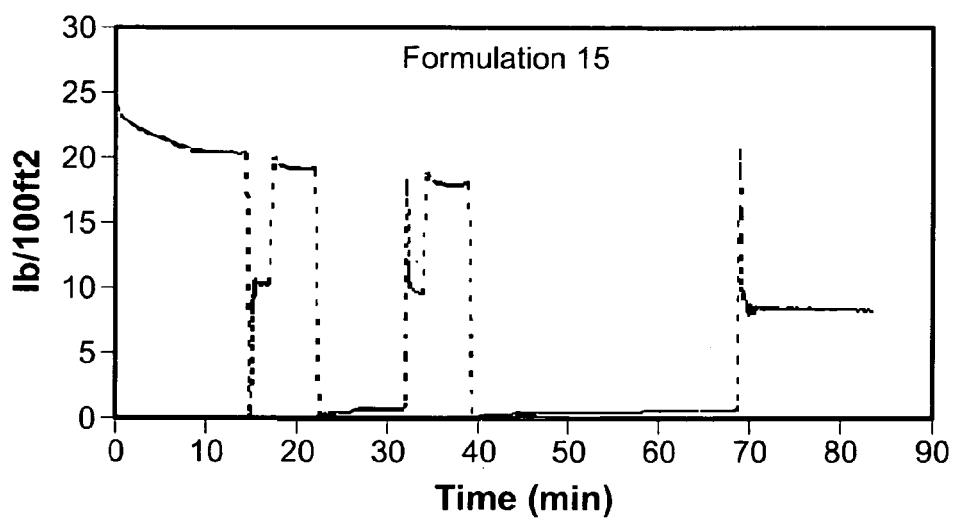
FIG. 7b is a graph showing fragile gel behavior of an example drilling fluid of the invention having a mud weight of 18 ppg

FIGS. 7a and 7b provide graphs showing "fragile gel" behavior of example clay-free drilling fluids of the invention having mud weights of 16 and 18 ppg, respectively. These graphs show that even at high mud weight and higher hot roll temperatures, a clay-free invert emulsion drilling fluid with the hydrophobic amine additive of the present invention demonstrates "fragile gel" behavior. Table 6 also shows another advantage of the invention—that HPHT fluid losses of high mud weight drilling fluids with a hydrophobic amine additive of the invention are lower than otherwise comparable drilling fluids without the hydrophobic amine additive. In addition, the HPHT filtrate of these fluids without the hydrophobic amine additive showed an undesirable presence of a solid mass.

The formulations for the 16 and 18 ppg fluids, whose test results are graphed in FIGS. 7a and 7b, are shown in Table 6 below, along with the test data.

TABLE 6

| | Formulation number | | | |
|---|---|---|---|---|
| | 14 Control | 15 Invention Formulation | 16 Control | 17 Invention Formulation |
| Mud weight (ppg) | 18 | 18 | 16 | 16 |
| Oil water ratio | 90/10 | 90/10 | 80/20 | 80/20 |
| EDC 99 DW ™ base oil, bbl | 0.468 | 0.468 | 0.45 | 0.45 |
| EZ MUL ® NT emulsifier, ppb | 14 | 14 | 14 | 14 |
| FACTANT ™ ppb | 2 | 2 | 2 | 2 |
| Lime, ppb | 3 | 3 | 3 | 3 |
| RHEMOD ® L suspension & viscosifying agent, ppb | 3 | 3 | 3 | 3 |
| ADAPTA ® filtration control agent, ppb | 0 | 0 | 3 | 3 |
| BDF 366, ppb | 3 | 3 | 0 | 0 |
| CaCl$_2$ brine, bbl | 0.066 | 0.066 | 0.139 | 0.139 |
| Rev Dust, ppb | 20 | 20 | 20 | 20 |
| BARACARB ® 5 sized calcium carbonate, ppb | 0 | 0 | 50 | 50 |
| BAROID, ppb | 546.2 | 546.2 | 387.4 | 387.4 |
| C36 dimer diamine, ppb | — | 2 | — | 2 |
| Hot Roll for 16 hours | 375 F. | 375 F. | 350 F. | 350 F. |
| 600 | 131 | 126 | 139 | 154 |
| 300 | 71 | 71 | 81 | 91 |
| 200 | 51 | 51 | 60 | 68 |
| 100 | 31 | 31 | 38 | 44 |
| 6 | 8 | 9 | 13 | 16 |
| 3 | 7 | 9 | 12 | 15 |
| PV | 60 | 55 | 58 | 63 |
| YP | 11 | 16 | 23 | 28 |
| LSYP | 6 | 9 | 15 | 14 |
| 10 sec. gel | 10 | 16 | 24 | 22 |
| 10 min. gel | 18 | 26 | 30 | 31 |
| HTHP ml in 30 min 350 F. for 16 ppg/ 375 F. for 18 ppg | 28 | 12 | 7.2 | 3 |

The advantages of the methods of the invention may be obtained by employing a drilling fluid of the invention in drilling operations. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. The fluids of the invention afford real-time monitoring and rapid adjustment of the fluid to accommodate changes in such subterranean formation conditions. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. A method for drilling in a subterranean formation comprising:
providing or using in the drilling an invert emulsion drilling fluid consisting essentially of an oleaginous continuous phase, a non-oleaginous discontinuous phase, and a hydrophobic amine additive having the following general structure:

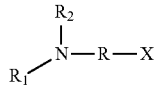

where R is a hydrophobic or partially hydrophobic group with carbon atoms ranging from about 16 to about 54, straight chained or branched, and aliphatic, cycloaliphatic or aryl aliphatic; N is a primary, secondary or tertiary amine wherein the R$_1$ and R$_2$ groups may be the same or different, and are selected from the group consisting of a hydrogen group, an alkyl group, a cyano alkyl group, an amino alkyl group, an amino aryl group, a hydroxyl alkyl group, a carbonyl group, a carbonate group, an alkoxy group, a hydroxyl group, any combination thereof, and any derivative thereof; X comprises a hydrophilic group selected from the group consisting of: a primary amine, a secondary amine, a tertiary amine, an amide group, an amine oxide group, a betaine group, an ester group, a carboxylic acid group, an ether group, a hydroxyl group, a phosphate group, a phosphonate group, a pyrrolidone group, a haloformyl group, a nitrate group, a nitrite group, a sulfate group, a sulfonate group, a imidazoline group, a pyridine group, a sugar group, any combination thereof, and any derivative thereof,
wherein when the drilling fluid is heated to 120 (±2)° F., and the plastic viscosity of the drilling fluid is tested at 120 (±2)° F., the drilling fluid with the hydrophobic amine additive shows an increase in plastic viscosity of 60% or less, when compared to the drilling fluid without the hydrophobic amine additive, and the drilling fluid with the hydrophobic amine additive has a characteristic selected from the group consisting of: an increased yield point; an increased low shear yield point; an increased gel strength; and any combination thereof.

2. The method of claim 1 wherein the drilling fluid is clay-free.

3. The method of claim 1 wherein the oleaginous continuous phase comprises at least one fluid selected from the group consisting of: a synthetic oil comprising an ester or olefin; a diesel oil; and a mineral oil selected from the group consisting of an n-paraffin, an iso-paraffin, a cyclic alkane, a branched alkane, and any mixture thereof.

4. The method of claim 1 wherein the drilling fluid has mud weight in the range of about 9 to about 18 ppg.

5. The method of claim 1 wherein the drilling fluid comprises from about 0.25 ppb to about 18 ppb of the hydrophobic amine additive.

6. The method of claim 1 wherein the drilling fluid has an oil:water ratio in the range of about 50:50 to about 95:5.

7. The method of claim 1 wherein the non-oleaginous discontinuous phase comprises an aqueous solution containing a water activity lowering material selected from the group consisting of: sugar; glycerol; salts selected from the group consisting of calcium chloride, calcium bromide, sodium chloride, sodium bromide, and formate; and combinations thereof.

8. The method of claim 1 wherein the drilling fluid with the hydrophobic amine additive, when compared to the drilling fluid without the hydrophobic amine additive, has a lower high-pressure-high-temperature fluid loss.

9. The method of claim 1 wherein the drilling fluid with the hydrophobic amine additive, under high-pressure-high-temperature conditions, has enhanced yield point, low-shear yield point and gel strength but similar or lower plastic viscosity, when compared to the drilling fluid without the hydrophobic amine additive.

10. The method of claim 1 where the invert emulsion fluid comprises at least one additive from the group consisting of: weighting agents, inert solids, fluid loss control agents, emulsifiers, salts, dispersion aids, corrosion inhibitors, emulsion thinners, emulsion thickeners, viscosifier, high-pressure-high-temperature emulsifier-filtration control agents, and any combination thereof.

11. The method of claim 1 further comprising drilling, running casing and/or cementing a wellbore in the subterranean formation.

12. A method for drilling in a high temperature subterranean formation comprising:
providing or using in the drilling an invert emulsion drilling fluid consisting essentially of a mud weight in the range of about 9 ppg to about 18 ppg, wherein the drilling fluid comprises a continuous oleaginous phase and a discontinuous non-oleaginous phase in an oil:water ratio in the range of about 50:50 to about 95:5, and a rheology modifier having the following general structure:

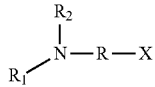

where R is a hydrophobic or partially hydrophobic group with carbon atoms ranging from about 16 to about 54, straight chained or branched, and aliphatic, cycloaliphatic or aryl aliphatic; N is a primary, secondary or tertiary amine wherein the $R_1$ and $R_2$ groups may be the same or different, and are selected from the group consisting of a hydrogen group, an alkyl group, a cyano alkyl group, an amino alkyl group, an amino aryl group, a hydroxyl alkyl group, a carbonyl group, a carbonate group, an alkoxy group, a hydroxyl group, any combination thereof, and any derivative thereof; X comprises a hydrophilic group selected from the group consisting of: a primary amine, a secondary amine, a tertiary amine, an amide group, an amine oxide group, a betaine group, an ester group, a carboxylic acid group, an ether group, a hydroxyl group, a phosphate group, a phosphonate group, a pyrrolidone group, a haloformyl group, a nitrate group, a nitrite group, a sulfate group, a sulfonate group, an imidazoline group, a pyridine group, a sugar group, any combination thereof, and any derivative thereof,
wherein when the drilling fluid is heated to 120 (±2)° F., and the plastic viscosity of the drilling fluid is tested at 120 (±2)° F., the drilling fluid with the rheology modifier shows an increase in plastic viscosity of 60% or less, when compared to the drilling fluid without the rheology modifier, and the drilling fluid with the rheology modifier has a characteristic selected from the group consisting of: an increased yield point; an increased low shear yield point; an increased gel strength; and any combination thereof.

13. The method of claim 12 wherein the oleaginous continuous phase comprises at least one oil selected from the group consisting of: thereof a diesel oil; an ester oil; an olefin; and a mineral oil selected from the group consisting of an n-paraffin, an iso-paraffin, a cyclic alkane, a branched alkane, and any mixture thereof.

* * * * *